United States Patent
Okamoto et al.

(10) Patent No.: US 10,981,314 B2
(45) Date of Patent: Apr. 20, 2021

(54) MOLD CLAMP CONTROL METHOD FOR INJECTION MOLDING MACHINE HAVING TOGGLE-TYPE MOLD CLAMPING MECHANISM

(71) Applicant: UBE MACHINERY CORPORATION, LTD., Ube (JP)

(72) Inventors: Akio Okamoto, Ube (JP); Kazuaki Miyamoto, Ube (JP)

(73) Assignee: UBE MACHINERY CORPORATION, LTD., Ube (JP)

( * ) Notice: Subject to any disclaimer, the term of this patent is extended or adjusted under 35 U.S.C. 154(b) by 292 days.

(21) Appl. No.: 16/081,214

(22) PCT Filed: Mar. 23, 2017

(86) PCT No.: PCT/JP2017/011697
§ 371 (c)(1),
(2) Date: Aug. 30, 2018

(87) PCT Pub. No.: WO2017/164303
PCT Pub. Date: Sep. 28, 2017

(65) Prior Publication Data
US 2019/0016032 A1      Jan. 17, 2019

(30) Foreign Application Priority Data

Mar. 24, 2016   (JP) .............................. JP2016-059315

(51) Int. Cl.
*B29C 45/70*    (2006.01)
*B29C 45/76*    (2006.01)
(Continued)

(52) U.S. Cl.
CPC ............ *B29C 45/70* (2013.01); *B29C 45/561* (2013.01); *B29C 45/766* (2013.01);
(Continued)

(58) Field of Classification Search
CPC .. B29C 45/661; B29C 45/662; B29C 45/7653
See application file for complete search history.

(56) References Cited

U.S. PATENT DOCUMENTS 4,131,596 A * 12/1978 Allen .................. B29C 45/7653
                                              264/40.5
5,756,019 A *  5/1998 Nakazawa .......... B29C 45/7653
                                              264/328.1
(Continued)

FOREIGN PATENT DOCUMENTS

JP     H08-258104 A     10/1996
JP     2000-176969 A    6/2000
(Continued)

OTHER PUBLICATIONS

May 9, 2017 International Search Report issued in International Patent Application No. PCT/JP2017/011697.

*Primary Examiner* — Benjamin A Schiffman
(74) *Attorney, Agent, or Firm* — Oliff PLC

(57) ABSTRACT

A mold clamp control method for an injection molding machine having a toggle-type mold clamping mechanism. The mold clamp control method includes: a low-pressure mold clamping step that performs position hold control by which a crosshead is held in a set holding position in a state where a toggle link has been bent, when injection-filling is started; and a compression-press step that performs speed and position control by which the crosshead is advanced toward a set advancement position from the set holding position in a state where a first output upper limit value has been provided to a driving section. Advancement of the crosshead is continued in at least part of the compression-press step in a state where a generated output of the driving section is maintained at the first output upper limit value.

7 Claims, 7 Drawing Sheets

(51) Int. Cl.
 *B29C 45/56* (2006.01)
 *B29C 45/78* (2006.01)
(52) U.S. Cl.
 CPC .......... *B29C 45/7653* (2013.01); *B29C 45/78* (2013.01); *B29C 2945/7611* (2013.01); *B29C 2945/7623* (2013.01); *B29C 2945/76083* (2013.01); *B29C 2945/76381* (2013.01); *B29C 2945/76568* (2013.01); *B29C 2945/76595* (2013.01)

(56) References Cited

U.S. PATENT DOCUMENTS

| | | | | |
|---|---|---|---|---|
| 6,716,374 | B2 * | 4/2004 | Yutani | B29C 45/561 |
| | | | | 264/1.33 |
| 6,998,076 | B2 * | 2/2006 | Ohshiro | B29C 45/561 |
| | | | | 264/328.7 |
| 7,132,068 | B2 * | 11/2006 | Hakoda | B29C 45/80 |
| | | | | 264/40.1 |
| 7,482,063 | B2 * | 1/2009 | Minoda | B29C 37/0028 |
| | | | | 264/241 |
| 7,740,776 | B2 * | 6/2010 | Okamoto | B29C 44/586 |
| | | | | 264/50 |
| 7,790,081 | B2 * | 9/2010 | Oota | B29C 37/0028 |
| | | | | 264/236 |
| 7,904,196 | B2 * | 3/2011 | Okazaki | B29C 45/77 |
| | | | | 700/203 |
| 7,972,544 | B2 * | 7/2011 | Okamoto | B29C 45/561 |
| | | | | 264/45.2 |
| 8,336,601 | B2 * | 12/2012 | Ono | B22D 17/26 |
| | | | | 164/153 |
| 9,597,827 | B2 * | 3/2017 | Hirose | B29C 45/7653 |
| 2008/0211126 | A1 * | 9/2008 | Kobayashi | B29C 45/7653 |
| | | | | 264/40.5 |
| 2012/0306112 | A1 * | 12/2012 | Tokuyama | B29C 45/768 |
| | | | | 264/40.5 |
| 2013/0307190 | A1 * | 11/2013 | Nagatomi | B22D 17/263 |
| | | | | 264/328.1 |

FOREIGN PATENT DOCUMENTS

| | | |
|---|---|---|
| JP | 2001-121595 A | 5/2001 |
| JP | 2007-21766 A | 2/2007 |
| JP | 2012-144042 A | 8/2012 |
| KR | 10-2009-0082224 A | 7/2009 |

* cited by examiner

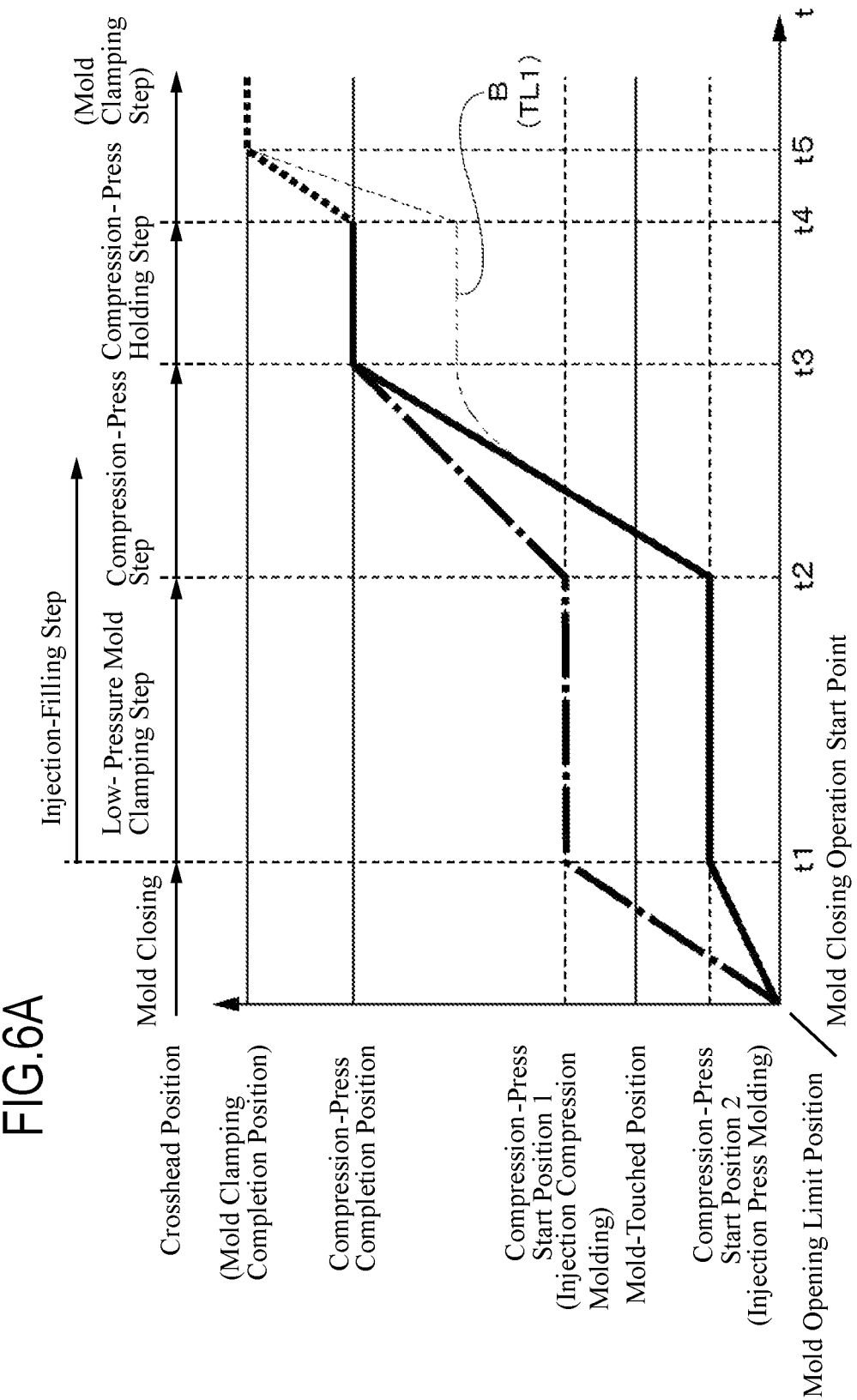

MOLD CLAMP CONTROL METHOD FOR INJECTION MOLDING MACHINE HAVING TOGGLE-TYPE MOLD CLAMPING MECHANISM

TECHNICAL FIELD

The present invention relates to a mold clamp control method for an injection molding machine having a toggle-type mold clamping mechanism, and particularly relates to a mold clamp control method having a low-pressure mold clamping step that performs position hold control by which a crosshead is held in a set holding position in a state where a toggle link has been bent, when injection-filling is started.

BACKGROUND ART

In a general injection molding method using an injection molding machine having a toggle-type mold clamping mechanism, first, a toggle link in a bent state is extended by movement in a mold closing direction (advancement) of a crosshead, a movable plate guided by a tie bar is moved to a fixed plate side, and a movable mold attached to the movable plate is mold-matched to (mold-touched on) a fixed mold attached to a fixed plate. In this state, the toggle link is not completely extended (bending angle ≠180°), and the tie bar maintains a substantially natural length where there is almost no occurrence of an elastic force in a longitudinal direction (a state where a certain elastic force in the longitudinal direction has occurred in the tie bar is also sometimes regarded as a mold-matched (mold-touched) state). Then, the crosshead is further advanced and the toggle link is completely extended (bending angle=180°, so that the tie bar is extended a certain amount more than the natural length in the longitudinal direction, whereby an elastic force in the longitudinal direction occurring in the tie bar based on same extension amount can be imparted as a mold clamping force on the movable mold and the fixed mold, via the movable plate and the fixed plate. Such a state where the toggle link is completely extended (bending angle=180° is referred to as a lockup state, and a state other than that where the toggle link is even only slightly bent (bending angle≠180°) is referred to as a non-lockup state.

Next, a molten state resin material (molten resin) is injection-filled from an injection apparatus, into an inside of a mold cavity formed between the movable mold and the fixed mold in a state where the mold clamping force has been imparted (mold clamped state). The molten resin injection-filled inside the mold cavity undergoes heat release from a surface region of molten resin flow contacting the likes of air in the mold cavity or a contact region with a mold cavity surface, whereby cooling and solidification due to temperature drop proceed and melt viscosity increases, hence fluidity and pressure propagation characteristics of the molten resin lower. Therefore, in order for the mold cavity to be completely filled with the molten resin while the molten resin has sufficient or required fluidity and pressure propagation characteristics, the molten resin is injection-filled into the inside of the mold cavity from the injection apparatus with a certain speed (injection speed) and pressure (injection pressure). As a result, a mold opening force occurs between the movable mold and the fixed mold, due to a rise in resin pressure based on the injection speed or injection pressure, of the molten resin inside the mold cavity.

The mold clamping force counters this mold opening force, thereby maintaining as a closed space the mold cavity formed between the movable mold and the fixed mold, and is imparted in order to prevent resin from spurting out (burr blow) from mold matching surfaces (mold dividing surfaces) of both molds. Therefore, mold clamping force adjustment (adjustment of an amount that the tie bar is extended more than the natural length in the longitudinal direction) is performed in the toggle-type mold clamping mechanism, so as to impart a mold clamping force which is larger than a maximum mold opening force estimated from various kinds of injection-filling conditions. In addition, the toggle-type mold clamping mechanism, as well as having an advantage that an output of a driving section for retreating/advancing the crosshead in a mold opening/closing direction, required to set the toggle link to the lockup state so as to impart the mold clamping force or to set to the non-lockup state by releasing the lockup state so as to release the mold clamping force, may be smaller than the imparted mold clamping force (boosting effect), also has an advantage that in the lockup state, the mold clamping force is maintained without this output of the driving section being maintained. Due to these advantages, the toggle-type mold clamping mechanism represents a main form of mold clamping mechanism alongside a direct pressure-type mold clamping mechanism.

On the other hand, in the toggle-type mold clamping mechanism, there are injection molding methods that start an injection-filling step in the non-lockup state, without setting the toggle link to the lockup state. One is an injection compression molding method that starts the injection-filling step in the non-lockup state where the crosshead has been advanced to a degree causing a low mold clamping force, from a state that the movable mold and the fixed mold have been mold-matched (mold-touched), or mold-touched state. In the injection compression molding method, there is performed position hold control (a low-pressure mold clamping step) by which the crosshead is held in a set holding position (target position), in a state where the toggle link has been bent countering the mold opening force occurring due to molten resin flow (the injection speed or injection pressure) of the molten resin injection-filled into the inside of the mold cavity. As a result, due to the mold opening force generated by injection-filling, the movable mold is mold-opened from the fixed mold a certain time and a certain amount, and, at the same time, the tie bar is also extended. A difference from a later-mentioned injection press molding method is that the low-pressure mold clamping step is started from a state where the mold dividing surfaces of the movable mold and the fixed mold are not opened.

Moreover, another is the injection press molding method that starts the injection-filling step in the non-lockup state where the movable mold has been mold-opened a certain amount from the fixed mold. Even in the injection press molding method, there is performed position hold control (a low-pressure mold clamping step) by which the crosshead is held in a set holding position (target position), in a state where the toggle link has been bent countering the mold opening force occurring due to injection-filling. The difference from the previously mentioned injection compression molding method is that the low-pressure mold clamping step is started from a state where the mold dividing surfaces of the movable mold and the fixed mold are opened. In these injection molding methods, by performing the injection filling step in a state where, due to mold opening, a mold cavity volume has been expanded to more than a desired volume of a resin molded product, a filling resistance is reduced, whereby a pressure deviation within the molten resin is reduced. This reduction of the pressure deviation reduces internal strain occurring during cooling and solidification.

In addition, these injection molding methods are characterized in having a step (a compression-press step) by which, after start of the injection-filling step, the mold cavity volume expanded by the above-described kind of mold opening is contracted to a normal volume by movement in the mold closing direction of the movable mold (movable plate). In the injection compression molding method, this movement in the mold closing direction of the movable mold (movable plate) is referred to as a compression operation, a compression step, or the like, and is generally performed by speed and position control by which the crosshead held in the set holding position countering the injection-filling is advanced to a set advancement position (target position).

On the other hand, in the injection press molding method, this movement of the movable mold (movable plate) is referred to as a press operation, a press step, or the like, and, similarly to in the injection compression molding method, is generally performed by speed and position control by which the crosshead held in the set holding position countering the injection-filling is advanced to a set advancement position (target position). The movement in the mold closing direction of the movable mold (movable plate) accompanying advancement of the crosshead, of the kind described above, in the injection compression molding method and the injection press molding method will be referred to as a compression-press step in the present application. Regarding the set advancement position of the crosshead in the compression-press step, first, this is set to a position corresponding to a position of the movable mold (movable plate) at which the mold cavity volume will be the normal volume, and after that set advancement position has been reached, there is a shift to a mold clamping step further advancing the crosshead to another target position at which a normal mold clamping force is generated, the crosshead is advanced to yet another target position at which a certain mold clamping force is generated, whereby from the set holding position to the set advancement position of the crosshead is divided into a plurality of sections, a set advancement position for each of the sections is set, and a variety of positions are set according to a molded product or molding conditions.

Moreover, in the compression-press step, speed and position control by which the crosshead is advanced at a set speed to the set advancement position (target position), is performed. As a result, an output required to maintain a set advancement speed of the crosshead is generated in the driving section of the toggle-type mold clamping mechanism, with respect to an advancement resistance force acting on the crosshead via the movable plate.

With respect to a general injection molding method in which molten resin is filled into the inside of the mold cavity only by resin flow of molten resin to inside a normal volume mold cavity from a gate (filling region of molten resin to the inside of the mold cavity), in the injection compression molding method or injection press molding method, due to the above-described kind of compression-press step in which the filling resistance during injection-filling is reduced by expanding the mold cavity volume and in which, by movement in the mold closing direction of the moveable mold (moveable plate) (volume contraction of the mold cavity), the molten resin inside the mold cavity whose volume has been expanded is filled by flow to an extremity region of the mold cavity in a state that a substantially uniform compression-press force has been imparted, a resin flow having a substantially uniform resin pressure is generated in an entirety of the molten resin inside the mold cavity, hence it is difficult for a resin pressure deviation to occur in the molten resin flowing to the extremity region inside the mold cavity, and internal strain occurring during cooling and solidification of the molten resin can be more reduced. Therefore, the injection compression molding method or injection press molding method is adopted in molding of a resin molded product such as a resin disk for a recording medium that requires shape deformation due to internal strain after molding to be more reduced or a thin wall resin molded product where effect due to shape deformation is large.

Note that in the injection compression molding method, the injection-filling step is started in a state where the mold dividing surfaces of the movable mold and the fixed mold are not opened, that is, a mold-closed state of the movable mold and the fixed mold (a mold-touched state, or a state where the crosshead has been advanced from the mold-touched state to a degree generating a low mold clamping force). Therefore, the mold attains a mold-opened state with substantially the same timing as a skin layer (initial solidified layer) is formed on a contact surface with a mold cavity inner surface of a molten resin surface. This skin layer has flexibility, hence can be likened to a state where a substance having fluidity (the molten resin) has been contained inside a rubber balloon (the skin layer). Therefore, provided there is a mold opening amount by which the molten resin contained by strength of the formed skin layer can be prevented from leaking to outside, an ordinary mold having flat mold dividing surfaces is frequently adopted, without molten resin leaking from between the mold dividing surfaces of the movable mold and the fixed mold. Exceptionally, when time is required for formation of the skin layer, when strength of the formed skin layer is low, or when the mold opening amount is large, and so on, a later-mentioned kind of mold having a shared-edge structure is used.

On the other hand, in the injection press molding method, the injection-filling step is started in a state where the mold dividing surfaces of the movable mold and the fixed mold are opened, hence the molten resin ends up leaking out from the opened mold dividing surfaces to the contact surface with the mold cavity inner surface of the molten resin surface, without time for the above-described kind of skin layer (initial solidified layer) to be formed. Therefore, excluding the exceptional case of the mold opening amount being minute, a mold having a shared-edge structure is generally adopted.

A shared-edge structure is sometimes also referred to as the likes of a pincer structure or a spigot joint structure, and is a structure generally known as a structure of mating sections forming mold-matching dividing surfaces of a mold. Specifically, it is a structure where, by forming between the movable mold and the fixed mold mating sections (concave-and-convex sections) extending in the mold opening/closing direction so as to be capable of insertion/removal into/from each other while sliding against each other, a mold cavity is maintained as a closed space, and it can be prevented that the molten resin that has been injection-filled into the inside of same mold cavity leaks out to outside of the mold or that burr blow occurs, even when the mold has been mold-opened a certain amount to expand the mold cavity volume.

Patent Document 1 discloses a molding method (injection press molding method) of a thin wall molded product, having: a compression step (compression-press step) in which, after a mold has first been set to a state of being opened a certain amount by a screw or plunger being driven in an axial direction and a mold cavity of said mold has been injected with a molten resin, this mold is mold-clamped and the injected molten resin is compressed; a pressure release step in which, in parallel with this compression step, the screw or plunger is retreated for a certain time, whereby a resin pressure of the molten resin in the mold is lowered; and a pressure hold step in which, after this pressure release step, a driving force in the axial direction is applied to the screw or plunger, whereby a certain resin pressure is applied to the molten resin.

This has an intention of solving non-uniformity of pressure of the molten resin in the molded product, that is, that due to the molten resin moving in a peripheral direction from a central section vicinity (gate vicinity) of the mold cavity by the compression step (compression-press step), resin pressure of a peripheral section of the mold cavity is low, whereas the gate vicinity is at a high pressure. That is, Patent Document 1 describes that by the screw or plunger being retreated during implementation of the compression step, pressure of the molten resin in the gate vicinity can be sharply reduced, hence the high pressure resin pressure of the gate vicinity is reduced, whereby non-uniformity of pressure of the molten resin in the molded product is relieved.

Moreover, Patent Document 2 discloses a molding method (injection compression molding method) of a disk molded product, in which an injection-filling step of a molten resin material is performed by mold clamping pressure control, and, that, after a peak of a mold retreat position of a movable mold accompanying injection-filling of the molten resin material, or, after start of injection, performs a shift-switch to a compression step (compression-press step) in which, after the mold clamping pressure has reached a predetermined certain mold clamping pressure, compression is performed by position controlling the movable mold to a predetermined certain mold position. This has an intention of stably performing compression by making a compression start timing in the compression step constant, and of making a compression amount uniform in the compression step by performing positioning control (movement control) of the movable mold as in an injection press molding method, and is substantively a mold clamp control method for an injection molding machine having a direct pressure-type mold clamping mechanism.

PRIOR ART DOCUMENT

Patent Document

Patent Document 1: JP-A-2012-144042
Patent Document 2: JP-A-2001-121595

SUMMARY OF INVENTION

Problem to be Solved by the Invention

In the molding method (injection press molding method) of a thin wall molded product of Patent Document 1, the compression step (compression-press step) performed on a mold clamping mechanism side and the pressure release step performed on an injection apparatus side, are performed in parallel. That is, control of a driving section output on the mold clamping mechanism side in the compression step and control of retreat speed or back pressure in the axial direction of the screw or plunger on the injection apparatus side for pressure reduction in the pressure release step, must be synchronized. Furthermore, since the pressure hold step is started after completion of the pressure release step or after completion of the compression step, control of the driving section output on the mold clamping mechanism side in the compression step and control of advancement speed or back pressure in the axial direction of the screw or plunger on the injection apparatus side in the pressure hold step must be synchronized according to a start timing of the pressure hold step.

However, considering the likes of differences in detection precision of each of sensors having different measurement objects such as position sensors or pressure sensors, or differences in responsiveness or communication speed based on detection signals thereof of the mold clamping mechanism or injection apparatus driven by different drive forms, it cannot but be said that synchronizing control of these different apparatuses to perform a desired synchronized control is difficult. Moreover, although Patent Document 1 also describes time control by a timer, it cannot but be said that if there occur changes in a molding state resulting from disturbances due to the likes of fluctuation in air temperature affecting temperature of the molten resin or fluctuation in temperature of apparatuses such as the injection apparatus or mold clamping mechanism of the injection molding machine, and mold, then time control is also difficult, even when molding conditions are the same.

Moreover, if, in the course of the resin pressure of the molten resin in the mold cavity rising and the molten resin being filled to corners of the mold cavity by the compression step (compression-press step), the resin pressure of the molten resin on a gate side of next largest volume to a product section ends up decreasing by the pressure release step, then there is a risk that pressure reduction of the molten resin in the gate vicinity affects flow speed or flow pressure of the molten resin to a peripheral section of the mold cavity and hinders molten resin filling to a mold cavity extremity region.

Thus, in the molding method (injection press molding method) of a thin wall molded product of Patent Document 1, there is a problem that relieving non-uniformity of pressure of the molten resin in the molded product during the compression step (compression-press step), that is, suppressing fluctuation in resin pressure of the molten resin in the mold cavity during the compression-press step, by control of the injection apparatus, is difficult.

On the other hand, the molding method (injection compression molding method) of a disk molded product of Patent Document 2 describes that by starting the compression step (compression-press step) with the same timing after injection start (after the peak of the mold retreat position of the movable mold has been detected, or after the mold clamping pressure has reached a certain mold clamping pressure) and, in that compression step, performing compression by position controlling the movable mold to a predetermined certain mold position, compression in the compression step is stably performed and its compression amount is made uniform. That is, the injection compression molding method of Patent Document 2 shifts to the compression-press step with the same timing after injection start (after the peak of the mold retreat position of the movable mold has been detected, or after the mold clamping pressure has reached a certain mold clamping pressure). In this compression step, a movable mold position (target position) to which the movable mold is moved and a speed with which the movable mold is caused to reach same movable mold position from compression step start are preset, and the compression step is performed advancing the movable mold to the fixed mold side based on this setting. As a result, in order to maintain a compression speed (advancement speed of the movable mold) during the compression step at a set speed (or acceleration), there is generated in the driving section of the mold clamping mechanism that moves the movable mold an output equivalent to an advancement resistance force of the movable mold.

Now, during this compression step (compression-press step) too, cooling and solidification due to temperature drop, of the molten resin inside the mold cavity proceeds and melt viscosity of the molten resin inside the mold cavity increases, hence in order to move the movable mold to the fixed mold side at the set speed, the output generated in the driving section of the mold clamping mechanism gradually increases with contraction of mold cavity volume. That is, in the compression-press step of the injection press molding method where movement speeds to the fixed mold side of the movable mold undergo constant-speed control at the set speed at a movement start time of the movable mold when a required output is small and immediately before completion of movable mold movement when the required output becomes largest, the output generated in the driving section of the mold clamping mechanism during the compression-press step gradually increases according to progress of cooling and solidification of the molten resin inside the mold cavity. The same applies also in the compression-press step of the injection compression molding method.

Therefore, in the compression-press step of the injection compression molding method or injection press molding method, there is a problem that a compression-press force imparted on the molten resin inside the mold cavity is not constant, and the resin pressure of the molten resin increases with temperature drop of the molten resin and contraction of the mold cavity volume. Even in a compression-press step capable of generating a resin flow having a substantially uniform resin pressure in an entirety of the molten resin inside the mold cavity, if there occurs a fluctuation such as the resin pressure increasing during same step, then a resin pressure deviation occurs in the molten resin inside the mold cavity based on said fluctuation, and an original advantage, namely, that of reducing the internal strain that occurs during cooling and solidification of the molten resin due to the compression-press step, ends up being reduced.

On the other hand, if, due to the likes of trouble on an injection apparatus side of the injection molding machine or a setting error of a measured resin amount, there is performed an overfilling where a greater than expected amount of molten resin is injection-filled into the inside of the mold cavity or an injection-filling of the molten resin exceeding an expected speed or expected pressure, then even in a low-pressure mold clamping step where position hold control holding the position of the mold (movable mold) is performed at the injection-filling start time as in the injection press molding method of Patent Document 1 or the injection compression molding method of Patent Document 2, the output generated in the driving section of the mold clamping mechanism increases not gradually, but sharply and exceeding an expected value. This is because position hold control of the mold (movable mold) in the low-pressure mold clamping step is also a speed control where constant-speed control setting the advancement speed of the mold (movable mold) to zero is performed, and position hold control that sets the advancement speed to zero, of the mold (movable mold) is performed, even countering a greater than expected mold opening force based on such overfilling or greater than expected injection speed or injection pressure.

Moreover, if the output generated in the driving section of the mold clamping mechanism increases sharply, particularly if overfilling is performed, in the low-pressure mold clamping step, in this way, then even in the compression-press step, the output generated in the driving section of the mold clamping mechanism increases sharply and exceeding an expected value. When an increase in output of the driving section has exceeded an expected value in the low-pressure mold clamping step or compression-press step in this way, there is a risk that that output rises to a mechanical upper limit value of same driving section and damages the mold clamping mechanism, injection apparatus, or mold. Furthermore, when the driving section of a mold clamping apparatus is a servomotor, there is a risk that the servomotor ends up tripping, continuation of the low-pressure mold clamping step or compression-press step becomes difficult, and the movable mold is mold-opened by a reaction force of the advancement resistance force acting on same driving section, whereby a core of the mold is damaged, or a risk that the molten resin spurts out from the mold even in a mold of shared-edge structure.

Therefore, in the injection compression molding method and the injection press molding method having a compression-press step where the advancement speed of the crosshead is constant-speed controlled at a set speed or a low-pressure mold clamping step where the movable mold position (crosshead position) undergoes position hold control (movement speed≈0), including the molding method of a disk molded product of Patent Document 2, there is a problem that the mold clamping mechanism cannot be protected against a greater than expected output generated in the driving section of the mold clamping mechanism.

Moreover, as described previously, even if implementing protection of the mold clamping mechanism, injection apparatus, or mold when the output generated in the driving section of the mold clamping mechanism has sharply increased is attempted by control of the injection apparatus as in the molding method (injection press molding method) of a thin wall molded product of Patent Document 1, it is difficult to synchronize control of the mold clamping mechanism side and the injection apparatus side. Such synchronized control itself will be even less effective and protection of the mold clamping mechanism, injection apparatus, or mold can be even less expected in the case where trouble on the injection apparatus side or a setting error of the measured resin amount, and so on, are presupposed.

The present invention was made in view of the above-described kinds of problems, and has an object of providing a mold clamp control method for an injection molding machine having a toggle-type mold clamping mechanism by which, specifically, in an injection compression molding method or injection press molding method, fluctuation in output in a driving section of the mold clamping mechanism and fluctuation in resin pressure of a molten resin inside a mold cavity during a compression-press step can be suppressed independently of control of an injection apparatus.

Means for Solving the Problem

The above-described object is achieved by a mold clamp control method for an injection molding machine having a toggle-type mold clamping mechanism, the toggle-type mold clamping mechanism bending/extending a toggle link by retreating/advancing a crosshead in a mold opening-and-closing direction by a driving section, and thereby mold-opening/closing and mold-clamping a movable mold attached to a movable plate, with respect to a fixed mold attached to a fixed plate, the mold clamp control method including:

a low-pressure mold clamping step that performs position hold control by which the crosshead is held in a set holding position in a state where the toggle link of the toggle-type mold clamping mechanism has been bent, when injection-filling is started; and a compression-press step that performs speed and position control by which the crosshead is advanced toward a set advancement position from the set holding position in a state where a first output upper limit value has been provided to the driving section of the toggle-type mold clamping mechanism, advancement of the crosshead being continued in at least part of the compression-press step in a state where a generated output of the driving section of the toggle-type mold clamping mechanism is maintained at the output upper limit value 1.

Moreover, in the mold clamp control method for an injection molding machine having a toggle-type mold clamping mechanism according to the present invention, the at least part of the compression-press step may be any position region between from the set holding position to the set advancement position or any time region during the compression-press step.

Additionally, in the mold clamp control method for an injection molding machine having a toggle-type mold clamping mechanism according to the present invention, the low-pressure mold clamping step may sometimes be started from a state where mold dividing surfaces are not opened, and sometimes be started from a state where mold dividing surfaces are opened.

Furthermore, in the mold clamp control method for an injection molding machine having a toggle-type mold clamping mechanism according to the present invention, in the compression-press step, from the set holding position to the set advancement position may be divided into a plurality of sections, and an advancement speed of the crosshead and the first output upper limit value in each of the sections may be set.

On the other hand, the mold clamp control method for an injection molding machine having a toggle-type mold clamping mechanism according to the present invention may include:

a low-pressure mold clamping protection step in which, in at least part of the low-pressure mold clamping step, a second output upper limit value is provided to the driving section of the toggle-type mold clamping mechanism, and when a mold opening force caused to act on the crosshead by the movable plate has exceeded a position holding force of the crosshead due to the second output upper limit value in the driving section, the crosshead retreats to a position at which the mold opening force and the position holding force become substantially equal, whereby the movable plate moves in the mold opening direction; and a low-pressure mold clamping return step in which, when the mold opening force has become smaller than the position holding force, the crosshead that has retreated in the low-pressure mold clamping protection step is advanced to the set holding position, whereby the movable plate is moved in the mold closing direction.

Moreover, in the mold clamp control method for an injection molding machine having a toggle-type mold clamping mechanism according to the present invention, the at least part of the low-pressure mold clamping step may be divided into a plurality of sections, and the second output upper limit value in each of the sections may be set.

Advantages of Invention

The mold clamp control method for an injection molding machine having a toggle-type mold clamping mechanism according to the present invention, wherein the toggle-type mold clamping mechanism bends/extends a toggle link by retreating/advancing a crosshead in a mold opening/closing direction by a driving section, and thereby mold-opens/closes and mold-clamps a movable mold attached to a movable plate, with respect to a fixed mold attached to a fixed plate, includes:

a low-pressure mold clamping step that performs position hold control by which the crosshead is held in a set holding position in a state where the toggle link of the toggle-type mold clamping mechanism has been bent, when injection-filling is started; and a compression-press step that performs speed and position control by which the crosshead is advanced toward a set advancement position from the set holding position in a state where a first output upper limit value has been provided to the driving section of the toggle-type mold clamping mechanism, wherein advancement of the crosshead is continued in at least part of the compression-press step in a state where a generated output of the driving section of the toggle-type mold clamping mechanism is maintained at the first output upper limit value, hence in an injection compression molding method or injection press molding method, fluctuation in output in a driving section of a mold clamping mechanism and fluctuation in resin pressure of a molten resin inside a mold cavity during a compression-press step can be suppressed independently of control of an injection apparatus.

EMBODIMENTS FOR CARRYING OUT THE INVENTION

Embodiments for carrying out the present invention will be described in detail below with reference to the accompanying drawings.

Embodiment 1

First, an injection molding machine 1 having a toggle-type mold clamping mechanism 10, and a mold clamp control method in an injection press molding method due to same injection molding machine 1, of embodiment 1 of the present invention will be described with reference to FIGS. 1 to 6.

Figure 1:
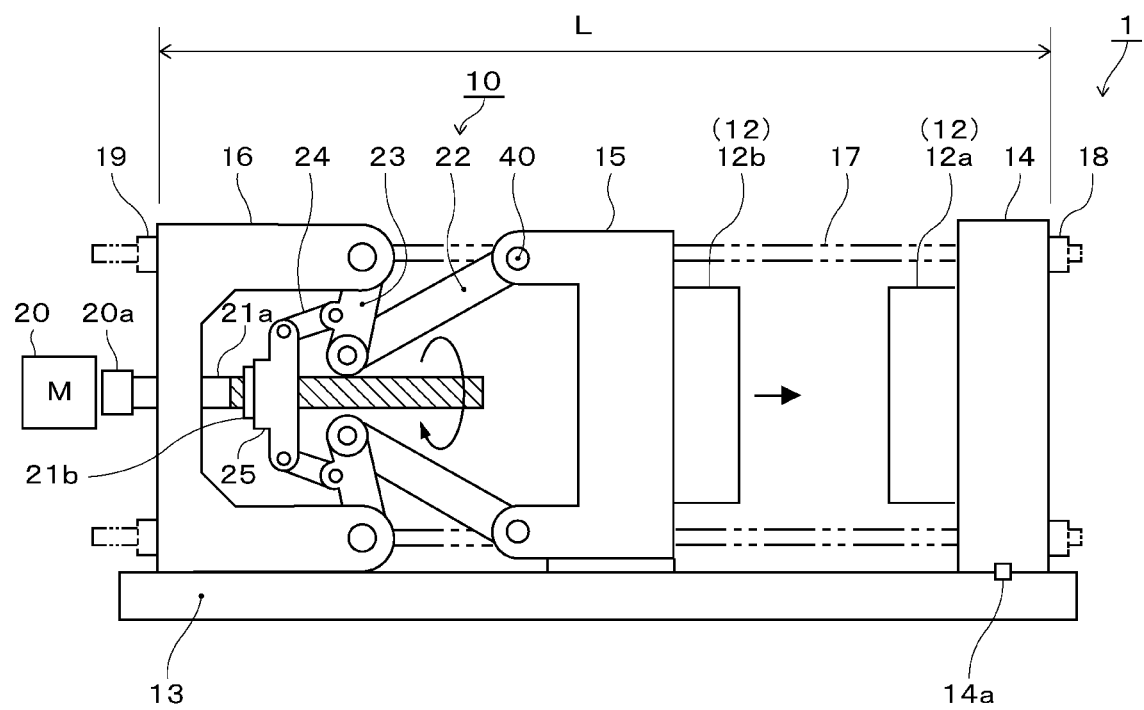
FIG. 1 is a schematic side view showing a state where a mold has been mold-opened to a mold opening limit position, of an injection molding machine having a toggle-type mold clamping mechanism.

The injection molding machine 1 of FIG. 1 is in a state where a movable mold 12b attached to a movable plate 15 has been mold-opened to a mold opening limit position. A fixed plate 14 is mounted in a fixed manner on a machine base 13, via a fixing key 14a. The movable plate 15 is mounted so as to be movable by sliding, on the machine base 13. A mold 12 configured from a fixed mold 12a and the movable mold 12b is installed between the fixed plate 14 and the movable plate 15, and by moving the movable plate 15 in a mold opening/closing direction (a left-right direction of FIG. 1), the movable mold 12b can be mold-opened/closed with respect to the fixed mold 12a. Note that due to it being unrequired in the subsequent description referring to FIGS. 1 to 4, illustration of an injection apparatus disposed in front of the fixed plate 14 (on a right side of FIG. 1) will be omitted in same FIGS. 1 to 4.

A toggle link is installed rearward of the movable plate 15 (on a left side of FIG. 1). One end of a toggle link 22 is coupled, via a toggle pin 40, to an upper side of the movable plate 15, and, furthermore, one end of a mid link 23 is coupled to the other end of the toggle link 22. The other end of the mid link 23 is coupled, via a toggle pin, to an upper side of a link housing 16, and a substantially middle section of same mid link 23 is also coupled, via a toggle pin, to one end of a crosshead link 24. The other end of the crosshead link 24 is coupled to an upper side of a crosshead 25.

On the other hand, a toggle link similar to that described above is configured also between lower sides of the movable plate 15 and the link housing 16, and the other end of the crosshead link 24 on a lower side is coupled to a lower side of the crosshead 25. Note that the toggle pins are all assumed to be that shown by reference numeral 40. However, in FIG. 1, notation of the toggle pins 40 is omitted, with only the toggle pin 40 on one end side (a movable plate 15 side) of the toggle link 22 being representatively notated. Moreover, the toggle link 22 and the mid link 23 are sometimes collectively referred to as the toggle link, in order to describe a bending/extension state of the two links (a bending angle between the two links).

Note that two guide rods are disposed (on this side and a far side of FIG. 1) substantially parallel with a ball screw shaft 21a of a later-mentioned ball screw mechanism, so as to project from the link housing 16 to the movable plate 15 side, and an end section on the movable plate 15 side of this guide rod is supported by the likes of a guide rod supporting plate supported by a tie bar 17, and so on. This guide rod has a configuration by which it penetrates left and right (this side and the far side of FIG. 1) of the crosshead 25 via a guide rod bush, and by which it supports a load acting in a vertical direction of the crosshead 25, including its own weight, and guides movement in the mold opening/closing direction of the crosshead 25. Due to the guide rods being disposed (on this side and the far side of FIG. 1) substantially parallel with the ball screw shaft 21a of the later-mentioned ball screw mechanism, if they are illustrated in the side views of FIG. 1, and so on, they will overlap the ball screw shaft 21a or crosshead 25 thereby becoming difficult to see, hence illustration of the guide rods is omitted.

Moreover, the ball screw shaft 21a of the ball screw mechanism as a rotary and linear motion converting mechanism penetrates the link housing 16 via an unillustrated rotary support mechanism such as a bearing to be supported so as to be rotatable with respect to the link housing 16 and in a state where its movement in the mold opening/closing direction is restricted. In addition, a nut body 21b combined with a screw section processed on an outer peripheral surface of the ball screw shaft 21a is disposed so as to penetrate in the mold opening/closing direction of the crosshead 25, and the ball screw shaft 21a and the crosshead 25 are coupled via that nut body 21b. Furthermore, a servomotor 20 is disposed rearward of the link housing 16 (on the left side of FIG. 1) in an unillustrated supporting member disposed in the link housing 16, and is coupled, via a coupling 20a, to an end section of the ball screw shaft 21a projecting rearward of the link housing 16 in the same way. Note that although, in order to simplify the drawings, a form has been adopted in which the servomotor 20 and the ball screw shaft 21a are directly coupled via the coupling 20a, there may be a form in which the likes of a transmission mechanism such as a gear or chain, or a pulley or pulley belt, or a clutch for protection of the servomotor 20, is disposed between the servomotor 20 and the ball screw shaft 21a.

The fixed plate 14, the movable plate 15, and the link housing 16 are penetrated by four tie bars 17, and each of the tie bars 17 is fixed to the fixed plate 14 by a fixed nut 18, and has its position fixed with respect to the link housing 16 by a movable nut 19. Moreover, similarly to the movable plate 15, the link housing 16 is also mounted so as to be movable by sliding, on the machine base 13. Now, the movable nut 19 is disposed so as to be rotatable in a plane rearward of the link housing 16 (on the left side of FIG. 1), and in a state where its movement in the mold opening/closing direction is restricted, and the movable nut 19 is capable of being rotated in the plane rearward of the link housing 16 by an unillustrated die height adjusting apparatus disposed in the same plane as the movable nut 19. Furthermore, by screwing together a screw section formed on an inner peripheral surface of the movable nut 19 and the screw section formed on the outer peripheral surface of the tie bar 17, a position in the mold opening/closing direction with respect to the link housing 16 of the tie bar 17 is fixed.

Due to this configuration, the movable nut 19 is rotated by the die height adjusting apparatus, and the link housing 16 and the movable plate 15 coupled to the link housing 16 by the toggle link are moved integrally in the mold opening/closing direction on the machine base 13, and adjusted to a position corresponding to a mold thickness of the mold 12 and a desired mold clamping force. In FIG. 1, the mold thickness and the mold clamping force are adjusted so that a distance from an end surface of the fixed plate 18 to an end surface of the link housing 16 (a total length of the tie bar 17) will be L (L).

From a mold-opened state where the toggle link has been bent to a maximum limit, shown in FIG. 1, the ball screw shaft 21a is rotated with respect to the link housing 16 by driving the servomotor 20. Now, the crosshead 25 coupled to the ball screw shaft 21a via the nut body 21b has its up-down direction coupled to the mid link 23 by the crosshead link 24, and, together with the nut body 21b, has its rotary motion in the same direction as a rotating direction of the ball screw shaft 21a restricted. Therefore, by rotary drive of the ball screw shaft 21a, the crosshead 25, together with the nut body 21b, moves (advances) in the mold opening direction (to the right side of FIG. 1) with a speed based on a rotational speed of the ball screw shaft 21a and a pitch (lead) of the screw section processed on the outer peripheral surface of the ball screw shaft 21. In this way, the crosshead 25 can be retreated/advanced in the mold opening/closing direction.

Due to this advancement of the crosshead 25, the mid link 23 coupled to the crosshead 25 via the crosshead link 24 and the toggle link 22 coupled to same mid link 23 via a link pin are extended from a bent state, whereby movement to a fixed plate 14 side of the movable plate 15 guided by the tie bar 17 can is started, and the movable mold 12b can be mold-closed onto the fixed mold 12a.

Figure 2:
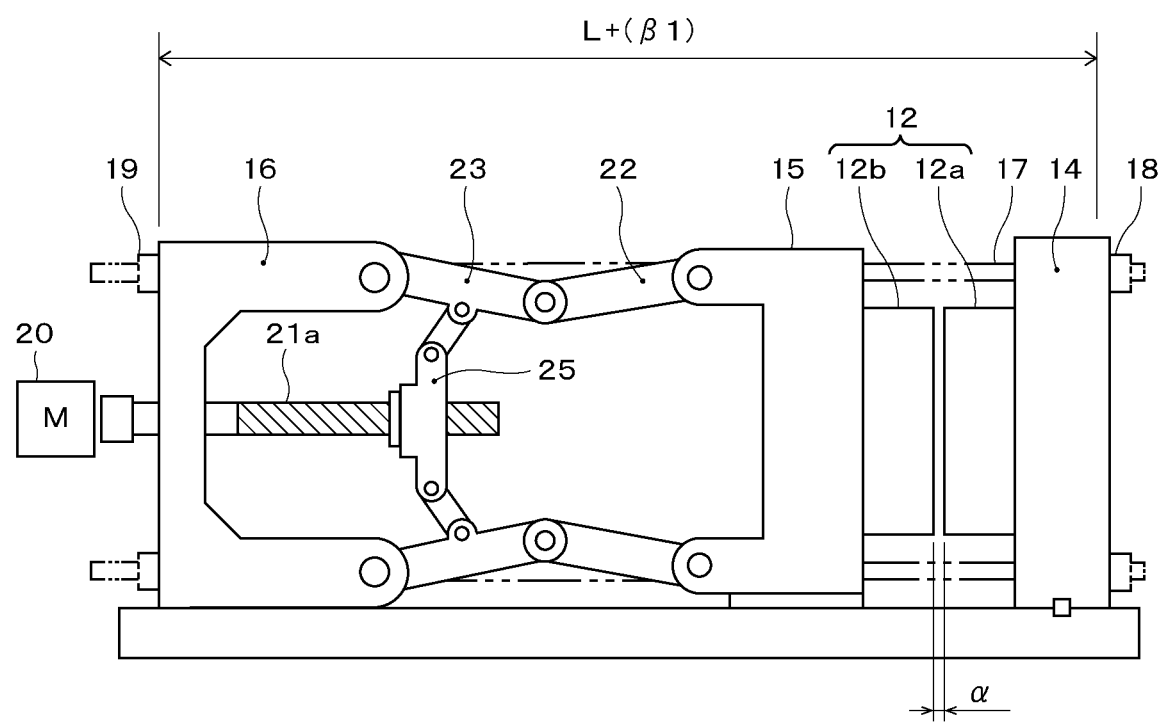
FIG. 2 is a schematic side view showing a mold clamping hold step in a state where mold dividing surfaces are opened, of the injection molding machine having a toggle-type mold clamping mechanism.

In the injection press molding method, an injection-filling step is started in a non-lockup state where the movable mold 12b has been mold-opened a certain amount from a mold-touched state with the fixed mold 12a. FIG. 2 shows the toggle-type mold clamping mechanism 10 in the non-lockup state where the movable mold 12b has been mold-opened a certain amount α (alpha) from the fixed mold 12a. In FIG. 2, the distance from the end surface of the fixed plate 18 to the end surface of the link housing 16 (the tie bar 17 total length) is assumed to be L+(β1) (beta-one), and this indicates that a total length L of the tie bar 17 before the injection-filling step is extended by β1 by a mold opening force generated in the movable mold 12b, due to start of the injection-filling step. Moreover, although FIGS. 1 to 4 omit detailed illustration of the mold 12 for simplification of the drawings, mold dividing surfaces of the movable mold 12b and the fixed mold 12a in the mold 12 are not flat, rather the mold 12 has a shared-edge structure where the mold dividing surfaces are each formed irregularly, and, as shown in FIG. 5A, even in a state where the movable mold 12b has been mold-opened the certain amount α from the fixed mold 12a, a mold cavity 50 formed between both molds is maintained as a closed space.

Figure 5A:
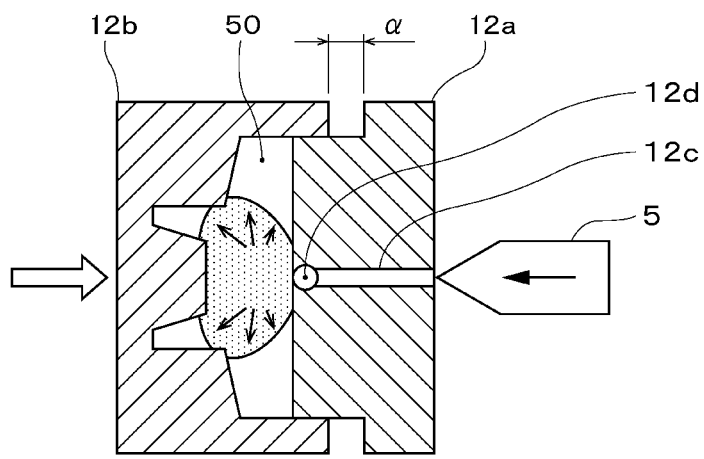
FIG. 5 includes schematic cross-sectional views explaining operation of a movable mold with respect to a fixed mold, in an injection molding method according to embodiment 1 of the present invention.

In FIG. 5A, a molten resin injected with a certain injection speed and injection pressure from an injection apparatus 5 is filled into an inside of the mold cavity 50 via a hot runner 12c of the fixed mold 12a and a gate valve 12d disposed in a gate portion (mold cavity side communication section of the runner). Even in such a state where the inside of the mold cavity 50 is not completely filled by the molten resin, a mold opening force caused by the injection speed or injection pressure of the molten resin acts on the movable mold 12b. Therefore, during the injection-filling step, position hold control (a low-pressure mold clamping step) is performed whereby the crosshead 25 is held in a compression-press start position 2 (set holding position) in the non-lockup state where the movable mold 12b is mold-opened the certain amount α (alpha) from the fixed mold 12a (a state where the toggle link 22 and the mid link 23 are bent), countering this mold opening force extending the tie bar 17 by β1. A graph where such position control of the crosshead 25 is indicated by a position in the mold opening/closing direction of the crosshead 25 with respect to elapsed time, is shown in FIG. 6A.

In the graph of FIG. 6A, the horizontal axis shows time t, and the vertical axis shows a position (assuming the mold closing direction to be plus) of the crosshead 25, where a mold opening limit position (vertical axis) and a mold closing operation start point (horizontal axis) are assumed to be the origin (zero). Regarding a mutual relationship of FIGS. 1 and 2 and FIGS. 5 and 6 referred to so far, explained simply, a mold-opened state of FIG. 1 corresponds to a state of the origin of the graph of FIG. 6A. Moreover, the non-lockup state where the movable mold 12b is mold-opened a certain amount α (alpha) from the fixed mold 12a, of FIG. 2 corresponds to during the injection-filling step (during the low-pressure mold clamping step) shown in FIG. 5A and to the thick solid line portion of the compression-press start position 2 (injection press molding method) between from time t1 to time t2 of FIG. 6A. This compression-press start position 2 is a position (set holding position/ target position) of the crosshead 25 undergoing position hold control when the injection-filling step is started, and a mold opening position of the movable mold 12b will be a mold opening position due to the toggle-type mold clamping mechanism 10 corresponding to this position of the crosshead 25. Note that the one dot-chain line shown from the origin to time t3 of the graph of FIG. 6A shows a position of the crosshead 25 in an injection compression molding method, hence description thereof will be omitted here.

Figure 6B:
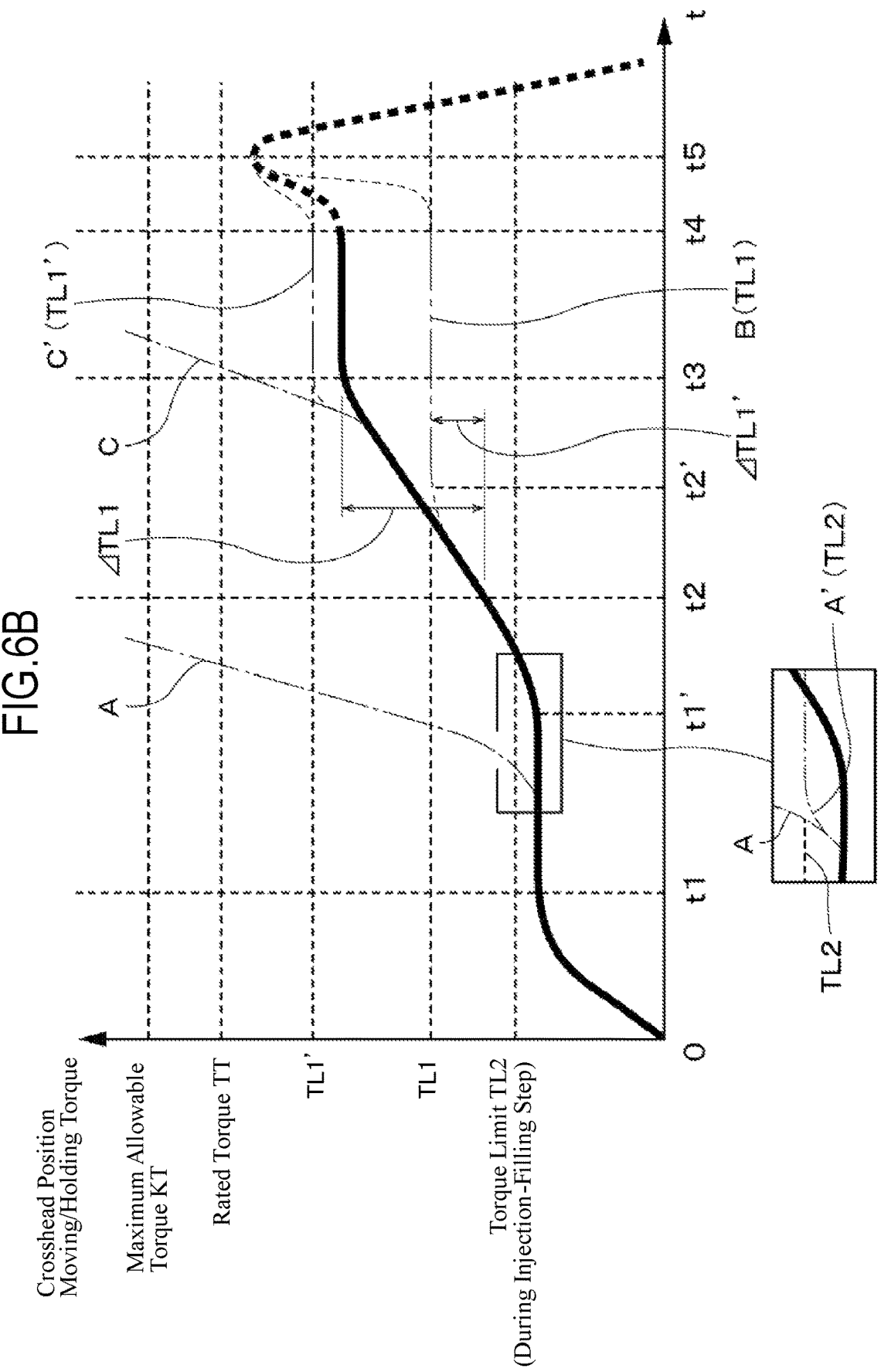
FIG. 6 includes graphs showing position control of a crosshead, and changes in moving/holding torque of same crosshead position in relation to elapsed time, of the injection molding machine having a toggle-type mold clamping mechanism, in the injection molding method according to embodiment 1 of the present invention.

In addition, change in a rotary torque (output) generated in the servomotor 20 moving/holding the position of the crosshead 25 during speed and position control of the crosshead 25, from the origin to time t2 of FIG. 6A is shown in the same way from the origin to time t2 of FIG. 6B. The rotary torque of the servomotor 20 rises to a value required to move the movable mold 12b in the mold closing direction from the mold opening limit position to the compression-press start position 2 at time t1. Moreover, when, substantially simultaneously to the movable mold 12b reaching the compression-press start position 2, the injection-filling step injecting the molten resin into the inside of the mold cavity 50 from the injection apparatus 5, like that shown in FIG. 5A is started, the servomotor 20 generates a rotary torque (output) required to hold the crosshead 25 in the compression-press start position 2, countering the mold opening force due to the injection-filling. The mold opening force generated during the injection-filling step is not constant, but fluctuates, and the rotary torque of the servomotor 20 generated to counter this, fluctuates. However, in a first half of the injection-filling step before the mold cavity 50 is completely filled (fully packed) by the molten resin, if injection-filling under appropriate conditions is continued, that fluctuation of the mold opening force is not large. Accordingly, to make the graph easy to understand, it is assumed that in the first half of the injection-filling step (for example, from time t1 to time t1'), the mold opening force and the rotary torque of the servomotor 20 generated based on this mold opening force are maintained at a maximum rotary torque required to hold the crosshead 25 in the compression-press start position 2, and are substantially constant. As a fully packed state of a latter half of the injection-filling step is neared with progression of the injection-filling step, a resin pressure of the molten resin inside the mold cavity 50 increases, and the generated mold opening force also increases. As a result, the rotary torque (output) required to hold the crosshead 25 in the compression-press start position 2 gradually increases.

Now, regarding the case where, during the injection-filling step (during the low-pressure mold clamping step) shown in FIGS. 2 and 5A, the previously described kind of overfilling or injection-filling of molten resin at a greater than expected speed or greater than expected pressure has been performed and a sharp rise in the mold opening force has occurred, in order that, in this case, the crosshead 25 is held in the compression-press start position 2 (set holding position) countering this rise in the mold opening force, the rotary torque (output) rises immediately to a rated torque TT as shown by A (the one dot-chain line) of the graph of FIG. 6B. Moreover, if, in spite of this, the movable plate 15 cannot be held in the compression-press start position 2, the rotary torque (output) rises to a maximum allowable torque KT with a time limit. If, even so, it is difficult for the crosshead 25 to be held in the compression-press start position 2, then, after reaching the maximum allowable torque KT, the servomotor 20 trips after a time limit that this maximum allowable torque KT can be maintained.

As a result, it becomes difficult for the crosshead 25 to be held in the compression-press start position 2 (set holding position) in a state where the toggle link 22 and the mid link 23 are bent, and the movable mold 12b (movable plate 15), being unable to counter the mold opening force, is further mold-opened from the fixed mold 12a. In this case, even in a mold of shared-edge structure, there is a risk that it becomes impossible for the mold cavity 50 to be maintained as a closed space and that the molten resin leaks out from the mold dividing surfaces. If the servomotor 20 trips, then, for safety, a molding cycle of the injection molding machine 1 is instantly stopped, even supposing that that situation of molten resin leakage is not reached. In the case that, in contrast to cycle stop (where the molding cycle is stopped at a time point when the molding cycle has been completed), the molding cycle has been stopped partway through, the need arises for recovery/molding-restart preparatory operations such as an operation to remove the molten resin inside the mold cavity 50 after waiting for its cooling and solidification or a removal and cleaning operation of the molten resin in the case it has leaked from the mold 12, and, even on an injection apparatus 5 side, a purge operation where, because a resin material inside the injection apparatus 5 including molten resin in a reservoir section deteriorates to a state where it cannot be used as it is at a time of restart of the next molding cycle, the injection apparatus 5 is separated from the fixed mold 12a to discharge the molten resin inside the injection apparatus 5, or a cleaning operation of the inside of the injection apparatus 5.

Now, usually, a servomotor is equipped with a safety mechanism that, for protection of a motor main body, trips the motor when a maximum allowable torque (KT) which is larger than a rated torque (TT) as a specification and that differs according to a time it can be maintained, has been generated continuously for a certain time. However, since this safety mechanism of the servomotor is just a protection of the motor main body, protection of an object driven by the servomotor is not taken into consideration. Therefore, in order to avoid damage of the mold, the toggle-type mold clamping mechanism, and the driving section, or avoid stopping of a molding step partway through the molding cycle due to an output (rotary torque) rise of same driving section following this kind of unexpected rise in the mold opening force during the injection-filling step (during the low-pressure mold clamping step), it is preferable for the driving section of the toggle-type mold clamping mechanism to be provided with an output upper limit value during the injection-filling step (during the low-pressure mold clamping step).

In embodiment 1, the servomotor 20 during the low-pressure mold clamping step is provided with an upper limit value of rotary torque (torque limit TL2/second output upper limit value), in addition to the original safety mechanism of the servomotor 20. A value of this torque limit TL2 is a value set with reference to a rotary torque (output) of the servomotor 20 by which a position holding force capable of countering the mold opening force expected during the injection-filling step under appropriate conditions is caused to act on the movable plate 15 (movable mold 12b) via the toggle-type mold clamping mechanism 10. In embodiment 1, it is assumed that a rotary torque capable of generating a position holding force slightly larger than the substantially constant mold opening force expected initially during the injection-filling step under appropriate conditions, is set as the torque limit TL2 (second output upper limit value). (a time region of from time t1 when the injection-filling step (low-pressure mold clamping step) is started to time t1'). Note that although in embodiment 1, the torque limit TL2 is provided in a portion (time t1 to time t1') excluding the latter half of the low-pressure mold clamping step (time t1' to time t2) when the inside of the mold cavity 50 during the low-pressure mold clamping step nears the fully packed state, the present invention is not limited to this, and it is possible for the torque limit TL2 to be set in any period. Moreover, the portion where the torque limit TL2 of the low-pressure mold clamping step has been provided (time t1 to time t1' in embodiment 1) may be divided into a plurality of sections, and respectively differing torque limits TL2 may be set in each of the sections.

Due to the torque limit TL2 being set in the servomotor 20, the rotary torque of the servomotor 20 never rises to the torque limit TL2 or more, even when normally there occurs a sharp rise in the rotary torque (output) of the servomotor 20 of the kind shown by A (the one dot-chain line) in the graph of FIG. 6B. Thus, when the mold opening force caused to act on the crosshead 25 by the movable plate 15 (movable mold 12b) has exceeded the position holding force of the crosshead 25 due to the torque limit TL2 in the servomotor 20, the crosshead 25 retreats to a position where the generated mold opening force and the position holding force of the crosshead 25 are substantially equal (are balanced), whereby the movable plate 15 (movable mold 12b) moves in the mold opening direction (low-pressure mold clamping protection step).

Moreover, when volume of the mold cavity 50 has increased due to this movement in the mold opening direction of the movable plate 15 (movable mold 12b) (low-pressure mold clamping protection step) and the generated mold opening force has thereby become smaller than the position holding force of the crosshead 25, the crosshead 25 that has retreated in the low-pressure mold clamping protection step is advanced to the compression-press start position 2 (set holding position), whereby the movable plate 15 (movable mold 12b) is moved in the mold closing direction (low-pressure mold clamping return step). Thus, even during position hold control at the compression-press start position 2 (set holding position) of the crosshead 25, it is the case that due to the torque limit TL2 being set in the servomotor 20, position control of the crosshead 25 is not required, and the crosshead 25 advances/retreats in the mold opening/closing direction with the compression-press start position 2 as an advancement limit, so that the generated mold opening force and the position holding force of the crosshead 25 due to the torque limit TL2 are balanced.

Due to such a low-pressure mold clamping protection step and low-pressure mold clamping return step, the rotary torque of the servomotor 20 is suppressed as shown by the two dot-chain line of A' (refer to inside the rectangle below the graph of same FIG. 6B) from A. As a result, even if by some chance a higher than expected rotary torque of the servomotor 20 has been generated in the low-pressure mold clamping step for the previously described kinds of reasons, this is suppressed due to the torque limit TL2, whereby damage of the toggle-type mold clamping mechanism or injection apparatus or mold can be prevented (they can be protected) and the molding cycle can be continued without tripping the servomotor 20, independently of control of the injection apparatus.

Furthermore, due to the above-described kind of low-pressure mold clamping protection step and low-pressure mold clamping return step, a pressure imparted on the molten resin inside the mold cavity 50 can be stabilized to not more than the position holding force due to the torque limit TL2, in a portion where the torque limit TL2 of the injection-filling step (low-pressure mold clamping step) has been provided, independently of control of the injection apparatus. Note that when the above-described kind of low-pressure mold clamping protection step or low-pressure mold clamping return step as a protection step has occurred during the low-pressure mold clamping step, there is a possibility that injection condition setting values such as filling resin amount, injection speed, and injection pressure related to the injection-filling are inappropriate or incorrect, or a possibility that some kind of abnormality has occurred on the injection apparatus side. Therefore, a configuration is preferably adopted whereby, when these protection steps have functioned, the gist of that is reported to an operator by the likes of an alarm or a display to an operating screen, and related data, such as timings at which these protection steps functioned, a retreat position of the crosshead, and a time required for the crosshead to return to the set holding position are recorded/displayed too, along with the gist.

Note that when it is desired to avoid damage of the mold, the toggle-type mold clamping mechanism, and the driving section, or avoid stopping of a molding step partway through the molding cycle in response to an unexpected output (rotary torque) rise of same driving section at a time of gradual increase (time region from time t1' to time t2) of the rotary torque (output) expected in the latter half of the injection-filling step (low-pressure mold clamping step) when the inside of the mold cavity 50 nears the fully packed state, it is preferable for the torque limit TL2 to be set on the large side, to the likes of a value which is larger than the rated torque (TT) of the servomotor 20 but smaller than the maximum allowable torque (KT) of the servomotor 20. Even when the expected rotary torque (output) is unknown, such a largish torque limit TL2 may be set in an entire region (from time t1 to time t2) of the injection-filling step (low-pressure mold clamping step), and a setting value or setting range of the torque limit TL2 may be narrowed while checking fluctuation of the rotary torque monitored during molding.

Next, at a certain timing after start of the injection-filling step, operation is shifted to a compression-press step in which the crosshead 25 is advanced from the compression-press start position 2 (set holding position) toward a compression-press completion position (set advancement position), thereby imparting a compression-press force on the molten resin inside the mold cavity 50. In embodiment 1, as shown in FIG. 6A, the low-pressure mold clamping step is continued up to time t2, and, from time t2 to time t3, control (speed and position control) that advances the crosshead 25 from the compression-press start position 2 to the compression-press completion position, is performed. In this compression-press step, movement in the mold closing direction of the movable plate 15 (movable mold 12b) causes volume of the mold cavity 50 to be reduced to substantially a normal volume, whereby the compression-press force is imparted substantially uniformly on the molten resin inside the mold cavity 50, and, as a result, a resin flow having a substantially uniform resin pressure is generated in the whole of the molten resin inside the mold cavity, whereby the molten resin can be caused to flow from a gate vicinity to an extremity region of the mold cavity 50.

Note that in the injection press molding method of embodiment 1, operation is shifted to the compression-press step in which the crosshead 25 is advanced to the compression-press completion position (set advancement position) at a set speed to move the movable mold 12b to the fixed mold 12a side, at a timing when setting values have been attained by any one or a plurality of setting items such as an elapsed time from start of the injection-filling step or an advancement position of a screw of the injection apparatus, or, as in Patent Document 2, a mold opening amount (extension amount of the tie bar 17) of the movable plate 15 (movable mold 12b) during the injection-filling step.

Figure 5B:
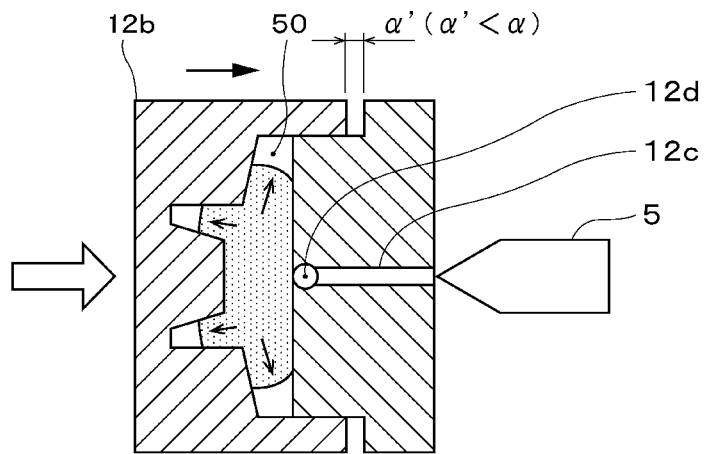

FIG. 5B is any time point between from time t2 to time t3 of FIG. 6A, and is a state where the mold opening amount α has been reduced to α' (α'<α). Note that in a general injection-filling method, in order to impart a certain pressure on the molten resin inside the mold cavity 50 from the injection apparatus side, the gate valve 12d shown in FIG. 5 is set to an open state for a certain time also after completion of the injection-filling step. However, in an injection press molding method or injection compression molding method, the previously described kind of movement in the mold closing direction of the movable plate 15 results in the compression-press force being imparted on the molten resin inside the mold cavity 50, hence the gate valve 12d is closed substantially simultaneously with completion of the injection-filling step.

Moreover, in the compression-press step, temperature of the molten resin inside the mold cavity 50 is lower than at a time of the low-pressure mold clamping step, and temperature drop of the molten resin progresses also during the compression-press step. Therefore, under such conditions, a large compression-press force becomes required in order to move the movable plate 15 (movable mold 12b) in the mold closing direction to reduce the volume of the mold cavity 50. As a result, a rotary torque (output) required to maintain the set advancement speed of the crosshead 25 against an advancement resistance force acting on the crosshead 25 via the movable plate 15 (movable mold 12b) is generated in the servomotor 20, and, with progression of the compression-press step, this required rotary torque (output) gradually increases. Change in the rotary torque generated in the servomotor 20 advancing the crosshead 25 in this period from time t2 to time t3 (period from the compression-press start position 2 to the compression-press completion position) is shown by the thick solid line portion between time t2 and time t3 of the graph of FIG. 6B. It is common for the rotary torque (output) generated in the servomotor 20 (driving section) to be larger in the compression-press step than in the low-pressure mold clamping step, in this way.

As shown by the thick solid line portion between time t2 and time t3 of the graph of FIG. 6B, in the compression-press step, speed and position control advancing the crosshead to the set advancement position is performed, hence even if the compression-press step has been performed normally, the rotary torque generated in the servomotor 20 gradually increases. An increase (fluctuation) in the rotary torque generated in the servomotor 20 for this period (from time t2 to time t3) is assumed to be Δ (delta) TL1. This increase (fluctuation) in the rotary torque ΔTL1 as it is represents a fluctuation in resin pressure of the molten resin inside the mold cavity during the compression-press step. Said fluctuation generates a resin pressure deviation in the molten resin inside the mold cavity, and ends up reducing an original advantage resulting from the compression-press step, that is, the advantage of a reduction in internal strain caused at a time of cooling and solidification of the molten resin.

In the present invention, in order to suppress this kind of increase (fluctuation) in the output (rotary torque) of the driving section (servomotor 20) during the compression-press step, the driving section of the toggle-type mold clamping mechanism is provided with a first output upper limit value during the compression-press step. In embodiment 1, an upper limit of rotary torque (torque limit TL1/first output upper limit value) is provided to the servomotor 20 (driving section) during the compression-press step. A value of this torque limit TL1 is preferably set to a rotary torque of the servomotor 20 that, with reference to a compression-press force considered optimal to be stably applied to the molten resin inside the mold cavity 50 during the compression step, enables this optimal compression-press force to be imparted on the molten resin inside the mold cavity 50, via the movable plate 15 (movable mold 12b).

As shown by the thin two dot-chain line B of FIG. 6B, after start of the compression-press step, the gradually increasing rotary torque of the servomotor 20 attains this torque limit TL1 (at time t2'), and then in a period up to time t3 when a compression-press holding step is started, advancement of the crosshead 25 is continued in a state where the rotary torque of the servomotor 20 is maintained at the torque limit TL1. That is, the increase (fluctuation) in the rotary torque generated in the servomotor 20 during the compression-press step (from time t2 to time t3) can be reduced (from ΔTL1 to ΔTL1'), and at least in part of the compression-press holding step (from time t2' to time t3), a compression-press force based on the torque limit TL1 can be substantially uniformly imparted on the molten resin inside the mold cavity 50. Due to such a suppression of fluctuation in resin pressure of the molten resin inside the mold cavity 50 and securing of impartation time of a substantially uniform compression-press force on same molten resin during the compression-press step, generation of the resin pressure deviation in the molten resin inside the mold cavity is more suppressed, whereby the original advantage, that is, the advantage of a reduction in internal strain caused at a time of cooling and solidification of the molten resin, can be more reliably obtained.

Note that during a normal compression-press step, if the rotary torque of the servomotor 20 is set so as to attain the torque limit TL1, then, along with the gradual increase in rotary torque of the servomotor 20 from the latter half of the low-pressure mold clamping step to the start time of the compression-press step, same rotary torque attains the torque limit TL1 at a certain timing after start of the compression-press step. Subsequently, the crosshead 25, restricted by same rotary torque (the torque limit TL1), is unable to maintain the set speed, and advances at a lower speed than the set speed. Therefore, as shown by the thin two dot-chain line B of FIG. 6A, after the rotary torque of the servomotor 20 has attained the torque limit TL1, an advancement position of the crosshead 25 cannot attain the compression-press completion position (set advancement position) at time t3 due to the advancement speed of the crosshead 25 decreasing, or, although not illustrated, the advancement position of the crosshead 25 requires even more time to attain the compression-press completion position (set advancement position). Moreover, if a setting value of the torque limit TL1 is too small, then sometimes, the advancement speed of the crosshead 25 lowers extremely or advancement becomes difficult, and an original object of the compression-press step, that is, to fill the molten resin inside the mold cavity 50 to extremities by the compression-press step, becomes difficult.

Therefore, it is desirable that the torque limit TL1 is set so that the advancement speed of the crosshead 25 sustainable after attainment of the torque limit TL1 will be in a range of speed reduction from the set speed permissible for a quality product, or that, under the advancement speed of the crosshead 25 sustainable after attainment of the torque limit TL1, the position of the crosshead 25 attainable within a desired time, or that desired time is reset as a new compression-press completion position (set advancement position).

Moreover, from the compression-press start position 2 (set holding position) to the compression-press completion position (set advancement position) may be divided into a plurality of sections, and the advancement speed of the crosshead 25 and the torque limit TL1 in each of the sections may be set. In this case, by setting the torque limit TL1 proportionately larger for a section in the latter half of the compression-press step where the rotary torque of the servomotor 20 rises, it is possible for speed reduction from an initial set speed, of the advancement speed of the crosshead 25 to be suppressed.

On the other hand, in the compression-press step, a larger compression-press force than during the low-pressure mold clamping step becomes required, hence a sharp rise in rotary torque of the kind shown by C (the one dot-chain line) in the graph of FIG. 6B sometimes occurs due to the previously described kind of overfilling during the injection-filling step (during the low-pressure mold clamping step) or (continuation of) injection-filling of the molten resin at a greater than expected speed or greater than expected pressure. The possibility of this is particularly high in the case where during the low-pressure mold clamping step, the sharp rise in rotary torque of the kind shown by A in the graph of FIG. 6B has been suppressed as shown by A' due to the torque limit TL2.

It goes without saying that such an unexpected output (rotary torque) rise of the driving section during the compression-press step is avoided by setting of the torque limit TL1 in embodiment 1 of the present invention. Moreover, when an effect on molded product quality of the increase (fluctuation) in rotary torque ΔTL1 generated in the servomotor 20 is small during the compression-press step, the torque limit TL1 may be set to prevent damage of the mold, the toggle-type mold clamping mechanism, and same driving section, like the torque limit TL2 in the low-pressure mold clamping step.

For example, as shown in FIG. 6B, in the compression-press step (from time t2 to time t3), a torque limit TL1' larger than the torque limit TL1 is assumed to be set instead of the torque limit TL1. Due to the torque limit TL1' being set in the servomotor 20, the rotary torque of the servomotor 20 never rises to the torque limit TL1' or more as shown by the thin two dot-chain line C' of FIG. 6B, even when a sharp rise in rotary torque of the servomotor 20 of the kind shown by C (the one dot-chain line) in the graph of same FIG. 6B has occurred. Moreover, the crosshead 25 that has been advancing stops when an advancement force of the crosshead 25 due to the torque limit TL1' of the servomotor 20 and an advancement resistance force acting on the crosshead 25 are in substantially the same state, and subsequently, the crosshead 25 advances proportionally to cooling and solidification contraction in the mold opening/closing direction of the molten resin inside the mold cavity until the crosshead 25 attains the compression-press completion position (set advancement position). Damage of the mold, the toggle-type mold clamping mechanism, and same driving section can be prevented, without the crosshead 25 ever being retreated as it is in the low-pressure mold clamping protection step in the low-pressure mold clamping step.

In such a compression-press step, the torque limit TL1 can both be set for suppression of fluctuation in resin pressure of the molten resin inside the mold cavity 50 and securing of impartation time of a substantially uniform compression-press force on same molten resin, and be set to prevent damage of the mold, the toggle-type mold clamping mechanism, and same driving section.

Now, embodiment 1 has described a form where, in the low-pressure mold clamping step, the servomotor 20 is provided with the torque limit TL2, and the low-pressure mold clamping protection step or low-pressure mold clamping return step are activated to prevent damage of the mold or toggle-type mold clamping mechanism and same driving section. On the other hand, also sometimes, in the case where these low-pressure mold clamping protection step or low-pressure mold clamping return step have activated in the latter half of the low-pressure mold clamping step when the injection-filling step has not been completed and the resin pressure of the molten resin inside the mold cavity is gradually increasing, operation shifts to the compression-press step during this low-pressure mold clamping protection step (during retreat of the crosshead 25) or during this low-pressure mold clamping return step (during advancement of the crosshead 25). In this case, the crosshead 25 does not stop at the compression-press start position 2 (set holding position), but continues to undergo speed and position control to the compression-press completion position by a crosshead advancement force due to the torque limit TL1 (output upper limit value).

Figure 3:
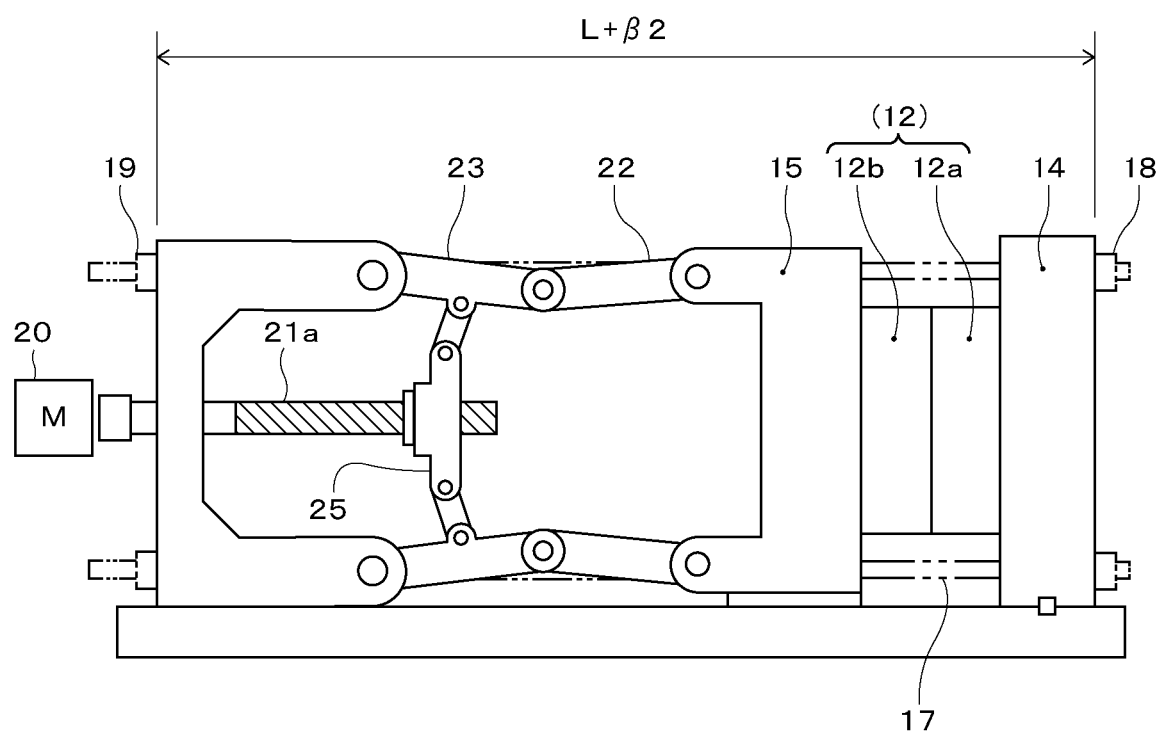
FIG. 3 is a schematic side view showing a state where the mold dividing surfaces have been mold-touched, of the injection molding machine having a toggle-type mold clamping mechanism.
Figure 5C:
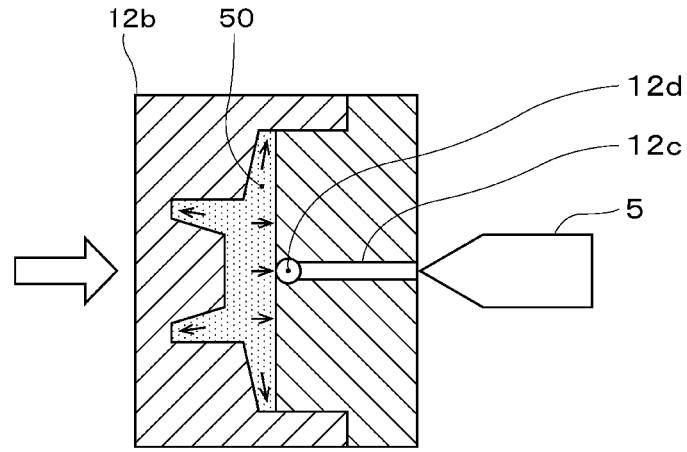

After the compression-press step, operation is shifted to the compression-press holding step in which the movable plate 15 (movable mold 12b) is held for a certain time in the compression-press completion position (set advancement position). In embodiment 1, as shown in FIG. 6A, the crosshead 25 is moved to the compression-press completion position by time t3, and in a period from time t3 to time t4, position hold control is performed whereby the crosshead 25 is held in the compression-press completion position. In this compression-press holding step, the molten resin that in the compression-press step has been caused to flow to an extremity region of the mold cavity 50 in a state of having been substantially uniformly imparted with the compression-press force and whose cooling and solidification has to a certain extent progressed, is brought into a final cooling and solidification state in a state where it continues to be substantially uniformly imparted with an appropriate compression-press force, whereby internal strain occurring in the molten resin during cooling and solidification is suppressed, and a contribution is made to suppression of shape deformation of a resin molded product due to the internal strain after molding. FIG. 5C is a state from time t3 to time t4 of FIG. 6A, and is a state where the movable mold 12b has been mold-closed onto the fixed mold 12a as shown in FIG. 3. In FIG. 3, the total length of the tie bar 17 is assumed to be L+β2 (beta-two), and this indicates that in the compression-press completion position, the tie bar 17 is extended by β2 by the compression-press force imparted on the movable mold 12b. Since position hold control of the crosshead 25 is performed in the compression-press holding step, the compression-press force imparted on the molten resin inside the mold cavity 50 at a start time of the compression-press holding step gradually undergoes pressure reduction in accordance with cooling and solidification contraction in the mold opening/closing direction of same molten resin.

Figure 4:
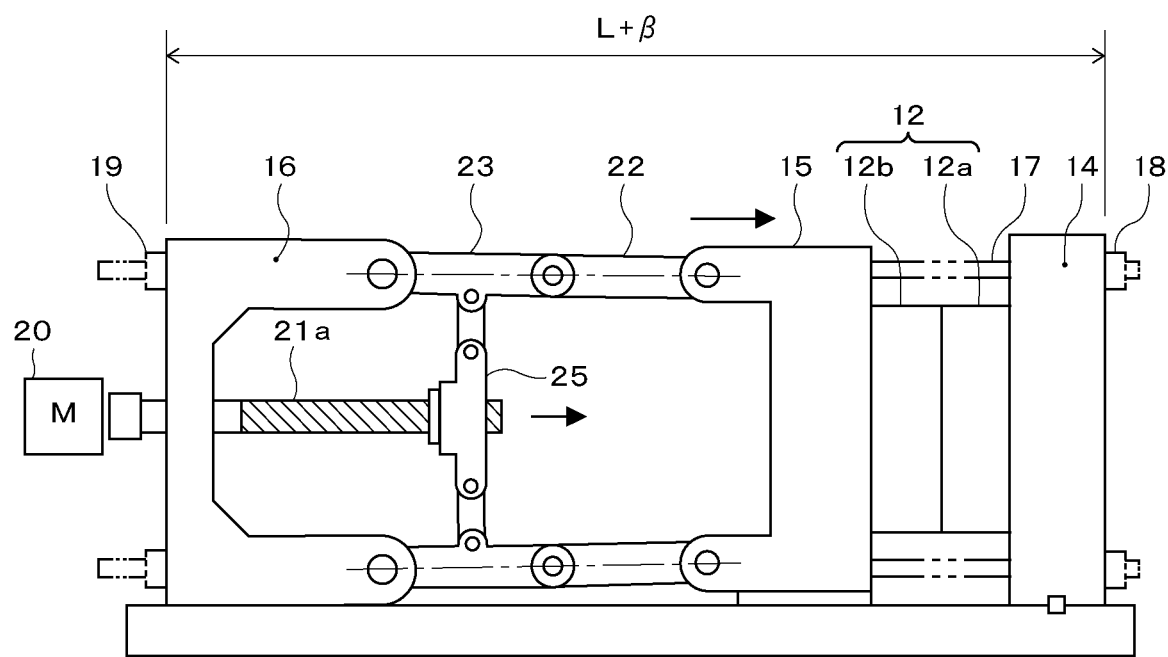
FIG. 4 is a schematic side view showing a mold-clamped state (lockup state) of the injection molding machine having a toggle-type mold clamping mechanism.

In the injection press molding method, the movable mold 12b may be mold-opened from the fixed mold 12a to remove the molded resin molded product, after this compression-press holding step. Moreover, there may further be performed a mold clamping step indicated by the thick dotted line from time t4 onward of FIG. 6A. To shift to the mold clamping step, the servomotor 20 is driven and the crosshead 25 is further advanced in the mold closing direction, whereby, as shown in FIG. 4, the toggle link 22 and mid link 23 are brought into the lockup state (bending angle=180°. At this time, as shown by the thick dotted line from time t4 onward in the graph of FIG. 6B, although the rotary torque of the servomotor 20 rises for lockup of the toggle link 22 and mid link 23, once the lockup state has been attained, the servomotor 20 is stopped, and there is no need for its rotary torque to be maintained. In FIG. 2, the total length of the tie bar 17 is further extended from L+β2 to L+β(β>β2), and a mold clamping force corresponding to that extension amount β of the tie bar 17 is imparted on the mold 12.

Embodiment 2

Next, a mold clamp control method in an injection compression molding method will be described. Embodiment 2 is the same as embodiment 1 in using the injection molding machine 1 having the toggle-type mold clamping mechanism 10. Therefore, the same reference numerals as in embodiment 1 will be adopted for configuring elements that are the same as in embodiment 1, and only differences from embodiment 1 will be described.

As previously described, the injection compression molding method begins the injection-filling step in the non-lockup state where the toggle link has been extended to an extent generating a low mold clamping force, from a mold-matched (mold-touched) state of the movable mold 12b and fixed mold 12a (FIG. 3). Then, position hold control is performed whereby the crosshead is held in the compression-press start position 1 (set holding position) in a state where the toggle link is bent, countering the mold opening force generated by molten resin flow (injection speed or injection pressure) of the molten resin that has been injection-filled into the inside of the mold cavity 50 (low-pressure mold clamping step). Then, the tie bar 17 is extended, whereby the movable mold 12b is mold-opened substantially the same amount as an extension amount of the tie bar 17, from the fixed mold 12a. Assuming this extension amount of the tie bar 17 to be α, the state shown in FIG. 2 is attained. In this case, the situation is easily understood by replacing the total length L+(β1) of the tie bar 17 in FIG. 2 by L+α. What differs is that whereas the injection press molding method starts the injection-filling step in the non-lockup state where the movable mold 12b has been mold-opened a certain amount from the fixed mold 12a, the injection compression molding method starts the injection-filling step from a mold-matched (mold-touched) state of the movable mold 12b and fixed mold 12a (a state where the mold 12 has not been opened).

Moreover, understanding is made easy by referring to FIG. 5 in a reverse order to that of embodiment 1, whereby in FIG. 5, the injection-filling step is started in a state where a low mold clamping force has been generated, from the mold-matched (mold-touched) state of the movable mold 12b and fixed mold 12a, of FIG. 5C, and the thereby generated mold opening force results in the tie bar 17 being extended as shown in FIGS. 5B and 5A, whereby the mold opening amount of the movable mold 12b from the fixed mold 12a enlarges from α' to α.

Moreover, the state before start of the injection-filling step shown in FIG. 3 corresponds to time t1 in the graph of FIG. 6A, and the mold opening state (mold opening amount α) shown in FIGS. 2 and 5A, if assumed to be a maximum mold opening state during the injection-filling step, corresponds to time t2 in the graph of FIG. 6A. Now, in the injection compression molding method of embodiment 2, as previously described, in a period from these time t1 to time t2 in the graph of FIG. 6A, the movable mold 12b is mold-opened from the fixed mold 12a by extension of the tie bar 17. In this period, position hold control is performed in the toggle-type mold clamping mechanism 10 whereby the crosshead 25 is held in the compression-press start position 1 (set holding position) in the non-lockup state where the toggle link has been extended to an extent generating a low mold clamping force, from the mold-matched (mold-touched) state of the movable mold 12b and fixed mold 12a (low-pressure mold clamping step). This is shown by the thick one dot-chain line between from time t1 to time t2 in the graph of FIG. 6A.

That is, even in the injection compression molding method, with only the "set holding position" of the position hold control of the crosshead 25 in the low-pressure mold clamping step overlapping the injection-filling step differing from in the low-pressure mold clamping step in the injection press molding method, the rotary torque generated in the servomotor 20 shows similar change to the period from time t1 to time t2 in the graph of FIG. 6B, and the generated rotary torque itself is generally larger than in an injection press molding method of the same scale. Therefore, because there is a possibility that, even in the injection compression molding method, there occurs a sharp rise in the mold opening force like that shown by A (the one dot-chain line) in the graph of same FIG. 6B during the low pressure mold clamping step, it is preferable that, even in the injection compression molding method, the servomotor 20 during the low-pressure mold clamping step is provided with the upper limit value of rotary torque (torque limit TL2/second output upper limit value) in order to prevent damage of (to protect) the toggle-type mold clamping mechanism or injection apparatus or mold and to avoid stopping of the molding step partway through a molding cycle.

Moreover, the crosshead 25 retreats to a position where the mold opening force caused to act on the crosshead 25 by the movable plate 15 (movable mold 12b) and the position holding force of the crosshead 25 due to the torque limit TL2 in the servomotor 20 are substantially equal (are balanced), whereby the movable plate 15 (movable mold 12b) moves in the mold opening direction (low-pressure mold clamping protection step). As described in embodiment 1, this low-pressure mold clamping protection step makes it possible to prevent damage of (to protect) the toggle-type mold clamping mechanism or injection apparatus or mold and to continue the molding cycle without the servomotor 20 being tripped, independently of control of the injection apparatus.

Even in the injection compression molding method of embodiment 2, operation is shifted to the compression-press step in which the crosshead 25 is advanced to the compression-press completion position (set advancement position) at a set speed to move the movable mold 12b to the fixed mold 12a side, at a timing when setting values have been attained by any one or a plurality of setting items such as an elapsed time from start of the injection-filling step or an advancement position of a screw of the injection apparatus, or, as in Patent Document 2, a mold opening amount (extension amount of the tie bar 17) of the movable plate 15 (movable mold 12b) during the injection-filling step.

Note that the injection compression molding method also has a form in which the movable mold 12b is slightly mold-opened from the fixed mold 12a by extension of the tie bar 17 during injection-filling, after which, with the position hold control of the crosshead 25 continuing to be maintained without the crosshead 25 being advanced as it is in the compression-press step, a compression-press force is imparted on the molten resin inside the mold cavity 50 by utilizing balance of a mold closing force due to an elastic force of the extended tie bar 17 and an advancement resistance force of the movable mold 12b caused by mold closing. Impartation of the compression-press force on the molten resin inside the mold cavity 50 in this form is also basically the same as impartation of the compression-press force in the compression-press step. Therefore, although similar advantages to those of embodiment 2 are displayed due to later-mentioned setting of the torque limit TL1 or torque limit TL1', a description thereof for this form will be omitted to simplify description.

Even in the compression-press step of the injection compression molding method of embodiment 2, similarly to in the compression-press step of the injection press molding method, speed and position control is performed whereby the crosshead 25 is advanced at a set speed from the compression start position 1 (set holding position) to the compression-press completion position (set advancement position), hence a rotary torque (output) required to maintain the set advancement speed of the crosshead 25 against the advancement resistance force acting on the crosshead 25 via the movable plate 15 (movable mold 12b) is generated in the servomotor 20, and with progression of the compression-press step, this required rotary torque (output) gradually increases.

In order to suppress such an increase (fluctuation) in output (rotary torque) of the driving section (servomotor 20) during the compression-press step, the servomotor 20 (driving section) during the compression-press step is provided with the upper limit value of rotary torque (torque limit TL1/first output upper limit value) also in embodiment 2. The fact that due to the torque limit TL1, generation of resin pressure deviation of the molten resin inside the mold cavity is more suppressed, thereby making it possible to more reliably obtain the original advantage, that is, the advantage of a reduction in the internal strain occurring during cooling and solidification of the molten resin, has been described in the injection press molding method of embodiment 1, hence a description thereof will be omitted here.

Moreover, regarding also that the sustainable advancement speed of the crosshead 25 is reduced after attainment of the torque limit TL1, similarly to in embodiment 1, setting of an appropriate torque limit TL1, or resetting of the compression-press completion position (set advancement position), or division into sections of from the compression-press start position 2 (set holding position) to the compression-press completion position (set advancement position) and setting of the torque limit TL1 for each of the sections, are desirable.

On the other hand, even in the compression-press step of the injection compression molding method of embodiment 2, similarly to in embodiment 1, there is a possibility of a sharp rise in rotary torque of the servomotor 20 occurring due to the required compression-press force increasing with temperature drop of the molten resin inside the mold cavity 50. Although such a rise in rotary torque of the servomotor 20 may also be avoided by setting of the torque limit TL1, it is also possible to provide the torque limit TL1' having an object of prevention of damage (protection) of the toggle-type mold clamping mechanism or injection apparatus or mold or of continuing the molding cycle without the servomotor 20 being tripped, as described in the compression-press step of the injection press molding method of embodiment 1.

Even in the injection compression molding method, the movable mold 12b may be mold-opened from the fixed mold 12a to remove the molded resin molded product, after this compression-press holding step. Moreover, the mold clamping step shown by the thick dotted line at time t4 onward of FIG. 6A may be further performed.

That concludes description of preferred embodiments of the present invention. However, technical range of the present invention is not limited to the range described in the above-mentioned embodiments. A variety of modifications or improvements may be added to each of the above-described embodiments.

For example, although in embodiment 1 and embodiment 2, the driving section of the toggle-type mold clamping mechanism was configured as a combination of the servomotor and the ball screw mechanism as the rotary and linear motion converting mechanism, this may be configured as a hydraulic actuator (hydraulic cylinder) that can drive with a certain driving force by supplying hydraulic oil of a certain pressure. Specifically, the present invention can be carried out by having a pressure control valve such as a relief valve that enables a relief pressure to be arbitrarily adjusted disposed in a hydraulic circuit sharing hydraulic oil with same hydraulic actuator or a hydraulic circuit discharging hydraulic oil from same hydraulic actuator, whereby a drive upper limit value (maximum allowable pressure) is provided at a time of drive of this hydraulic actuator, when moving the crosshead in the mold closing direction.

DESCRIPTION OF REFERENCE NUMERALS 1 injection molding machine
5 injection apparatus
10 toggle-type mold clamping mechanism
12a fixed mold
12b movable mold
14 fixed plate
15 movable plate
17 tie bar
20 servomotor
21a ball screw shaft (ball screw mechanism)
21b nut body (ball screw mechanism)
22 toggle link
23 mid link
24 crosshead link
25 crosshead
50 mold cavity

The invention claimed is:

1. A mold clamp control method for an injection molding machine having a toggle-type mold clamping mechanism,
the toggle-type mold clamping mechanism bending/extending a toggle link by retreating/advancing a crosshead in a mold opening/closing direction by a driving section which has a servomotor, and thereby mold-opening/closing and mold-clamping a movable mold attached to a movable plate, with respect to a fixed mold attached to a fixed plate,
the mold clamp control method including:
a low-pressure mold clamping step that performs position hold control by which the crosshead is held in a set holding position in a state where the toggle link of the toggle-type mold clamping mechanism has been bent, when injection-filling is started; and
a compression-press step that performs speed and position control by which the crosshead is advanced toward a set advancement position from the set holding position in a state where a first output upper limit value has been provided to a rotary torque of the servomotor of the driving section of the toggle-type mold clamping mechanism,
advancement of the crosshead being continued in at least part of the compression-press step in a state where a generated output of the servomotor of the driving section of the toggle-type mold clamping mechanism is maintained at the first output upper limit value,
the mold clamp control method further including:
a low-pressure mold clamping protection step in which, in at least part of the low-pressure mold clamping step, a second output upper limit value is provided to the rotary torque of the servomotor of the driving section of the toggle-type mold clamping mechanism, and when a mold opening force caused to act on the crosshead by the movable plate has exceeded a position holding force of the crosshead due to the second output upper limit value in the servomotor of the driving section, the crosshead retreats to a position at which the mold opening force and the position holding force become substantially equal, whereby the movable plate moves in the mold opening direction, wherein the low-pressure mold clamping protection step occurs during the injection-filling; and
a low-pressure mold clamping return step in which, when the mold opening force has become smaller than the position holding force, the crosshead that has retreated in the low-pressure mold clamping protection step is advanced to the set holding position, whereby the movable plate is moved in the mold closing direction.

2. The mold clamp control method for an injection molding machine having a toggle-type mold clamping mechanism according to claim 1, wherein
the at least part of the compression-press step is any position region between from the set holding position to the set advancement position or any time region during the compression-press step.

3. The mold clamp control method for an injection molding machine having a toggle-type mold clamping mechanism according to claim 2, wherein
in the compression-press step, from the set holding position to the set advancement position is divided into a plurality of sections, and an advancement speed of the crosshead and the first output upper limit value in each of the sections are set.

4. The mold clamp control method for an injection molding machine having a toggle-type mold clamping mechanism according to claim 1, wherein
the low-pressure mold clamping step is started from a state where mold dividing surfaces are not opened.

5. The mold clamp control method for an injection molding machine having a toggle-type mold clamping mechanism according to claim 1, wherein
the low-pressure mold clamping step is started from a state where mold dividing surfaces are opened.

6. The mold clamp control method for an injection molding machine having a toggle-type mold clamping mechanism according to claim 1, wherein
in the compression-press step, from the set holding position to the set advancement position is divided into a plurality of sections, and an advancement speed of the crosshead and the first output upper limit value in each of the sections are set.

7. The mold clamp control method for an injection molding machine having a toggle-type mold clamping mechanism according to claim 1, wherein the at least part of the low-pressure mold clamping step is divided into a plurality of sections, and the second output upper limit value in each of the sections is set.

* * * * *